Feb. 25, 1969 W. A. OLSEN, JR., ET AL 3,429,058

REDUCED GRAVITY LIQUID CONFIGURATION SIMULATOR

Filed April 27, 1967 Sheet 1 of 2

INVENTORS.
WILLIAM A. OLSEN JR.
ISADORE I. PINKEL
BY
Gene E. Shook
ATTORNEYS

Feb. 25, 1969 W. A. OLSEN, JR., ET AL 3,429,058
REDUCED GRAVITY LIQUID CONFIGURATION SIMULATOR
Filed April 27, 1967 Sheet 2 of 2

INVENTOR.
WILLIAM A. OLSEN JR
ISADORE I. PINKEL
BY
ATTORNEYS

United States Patent Office 3,429,058
Patented Feb. 25, 1969

3,429,058
REDUCED GRAVITY LIQUID CONFIGURATION SIMULATOR
William A. Olsen, Jr., Lakewood, and Isadore I. Pinkel, Fairview Park, Ohio, assignors to the United States of America as represented by the Administrator of the National Aeronautics and Space Administration
Filed Apr. 27, 1967, Ser. No. 635,327
U.S. Cl. 35—49                    16 Claims
Int. Cl. G09b 23/06

ABSTRACT OF THE DISCLOSURE

A reduced gravity liquid configuration simulator for liquid containers including a pair of spaced, flat, parallel glass plates having a relatively thin, peripheral gasket therebetween to form a closed liquid-receiving space between the plates and interiorly of the gasket. A test (i.e. rocket fuel) liquid is disposed in said space to partially fill the same. The gasket is of a preselected thickness whereby the glass plates are spaced from each other a distance permitting the test liquid to contact both plates. Suitable selective tilting means are provided to position the glass plates at preselected angles to the horizontal whereby the configuration of the test liquid between the glass plates may be observed as the plates are tilted to said preselected angles, each such angle providing a reduced gravity effect on the test liquid ranging from 1 to near "zero" gravity. With this construction, there is provided a two-dimensional view of a (transverse) section of a fuel tank subjected to reduced gravity fields.

---

The invention described herein was made by employees of the United States Government and may be manufactured and used by or for the Government of the United States of America for governmental purposes without the payment of any royalties thereon or therefor.

This invention relates to a reduced-gravity liquid configuration simulator for liquid containers and more particularly to such a simulator providing a two-dimensional view of a (transverse) section of a fuel tank subjected to reduced gravity fields.

With the advent of space exploration, a critical need has arisen for the study of the behavior of liquid propellants in storage tanks while exposed to reduced gravity fields. This condition is encountered by space vehicles during planetary orbital missions and during periods of coast on interplanetary space missions. A knowledge of liquid configuration under such conditions is needed to solve problems related to tank venting, liquid transfer, orientation control of space vehicles, heat transfer, etc.

Prior reduced gravity studies of static liquid configuration in propellant tanks include zero-gravity trajectories in aircraft, drop towers, and a simulator using the same density but different surface tension liquids. However, such methods are exceedingly expensive and needlessly time consuming.

A device that quickly, simply and inexpensively shows the approximate shape of a liquid propellant in a rocket fuel tank subject to reduced gravity would be of substantial help to the engineer and designer in this field.

Therefore, it is an object of the invention to provide a reduced gravity liquid configuration simulator which quickly indicates the isothermal equilibrium liquid configuration of liquid fuel in propellant tanks of various sizes and shapes that are subjected to reduced gravity fields ranging from one to near "zero" gravity.

A further object of the invention is to provide a liquid configuration simulator of the above type that is simple in construction, inexpensive to manufacture, and highly effective in operation.

Briefly the foregoing objects are accomplished by the provision of a reduced-gravity liquid configuration simulator for liquid containers including a pair of spaced, parallel, flat glass plates having a peripheral rubber boundary gasket therebetween to form a closed liquid-receiving space between the plates and within the gasket. A suitable test liquid (rocket fuel) is disposed in such space (partially filling the same) by means of a hypodermic needle inserted through the rubber gasket. A second hypodermic needle may be inserted through the gasket to function as a vent when the space is receiving liquid. The spacing of the plates is determined by the thickness of the gasket. In the preferred form, the plates are spaced apart a distance slightly less than the distance needed for the test liquid to contact both plates. Means are provided for selectively tilting the spaced plates (as a unit) to preselected angles to the horizontal, each such angle representing a different reduced-gravity effect on the test liquid. The configuration of the test liquid between the glass plates as the same are tilted to said angles to the horizontal represents a two dimensional view of a transverse section of a fuel tank subjected to various corresponding reduced-gravity fields. Such configurations compare most favorably with configurations achieved by other methods, such as, for example, the drop-tower method.

Other objects and advantages of the invention will be apparent from the following description taken in conjunction with the drawings wherein.

Although the invention is shown and described herein with reference to rocket fuel tanks, it may be applied to any type of liquid container.

Figure 1:
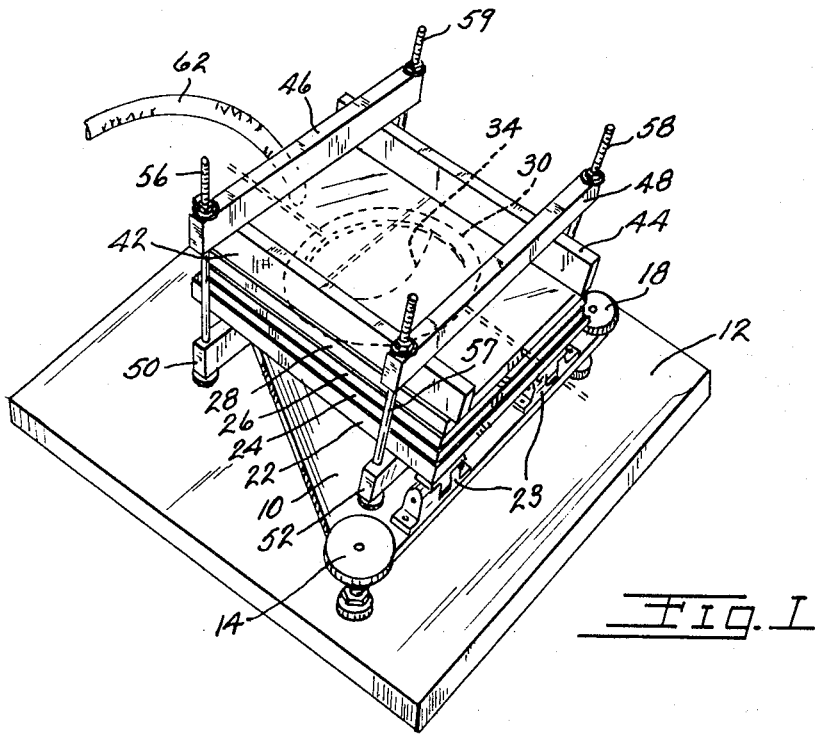
FIGURE 1 is a perspective view of a reduced-gravity liquid configuration simulator constructed in accordance with the invention.
Figure 2:
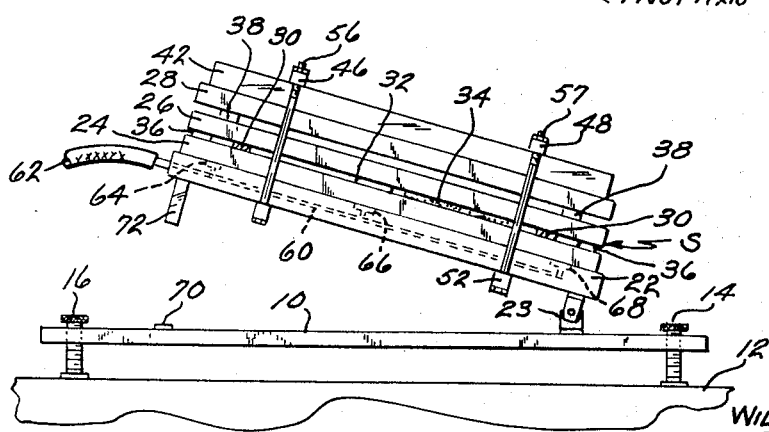
FIGURE 2 is a side elevational view of the simulator shown in FIGURE 1, and showing the same disposed at an operative angle to the horizontal.

Referring first to FIGURES 1 and 2 there is shown a reduced-gravity liquid configuration simulator of the invention generally designated as S and including a base plate 10 which is disposed on a level surface 12, said plate 10 being maintained horizontal on the surface 12 by the leveling screws 14, 16 and 18. The simulator S also includes a bed plate 22 hinged to the base 10 by means of the hinge 23, a lower glass plate 24 disposed on the plate 22, an upper glass plate 26 disposed above the plate 24 and a clamping plate 28 disposed above the plate 26. A resilient (preferably rubber) endless peripheral gasket or member or object 30 is disposed between the glass plates 24 and 26, in liquid sealing relation therewith, to form a closed liquid receiving space 32 for receiving a test liquid 34 as will be hereinafter described in detail. Spacers 36 are also disposed between the plates 24 and 26 to maintain proper spacing between such plates. An upper gasket 38 is disposed between the plates 26 and 28 to provide uniform clamping therebetween.

The assembly thus far described forms a composite unit that is clamped together by a suitable clamping means including a first pair of spaced parallel clamping boards 42 and 44 disposed on the clamping plate 28, a second pair of spaced parallel clamping boards 46 and 48 disposed on the first pair of boards 42 and 44, a third pair of spaced parallel clamping boards 50 and 52 disposed on the underside of the bed plate 22, and a plurality of adjustable clamping bolts 56, 57, 58 and 59 connecting the second pair of boards 46, 48 and the third pair of boards 50, 52 together to retain the bed plate 22, the lower and upper glass plates 24 and 26, and the clamping plate 28 together as a composite unit.

The lower glass plate 24 is securely held to the bed plate 22 in tight air-sealing relation by a vacuum means in the form of at least one passageway 60 formed in the bed plate and connected at its outer end to a vacuum hose 62, which, in turn, is connected to an associated source of vacuum producing means. The inner end of the passageway 60 leads to a plurality of open vacuum channels 64, 66, and 68 in the upper surface of the bed plate 22.

Figures 3, 4, 5:
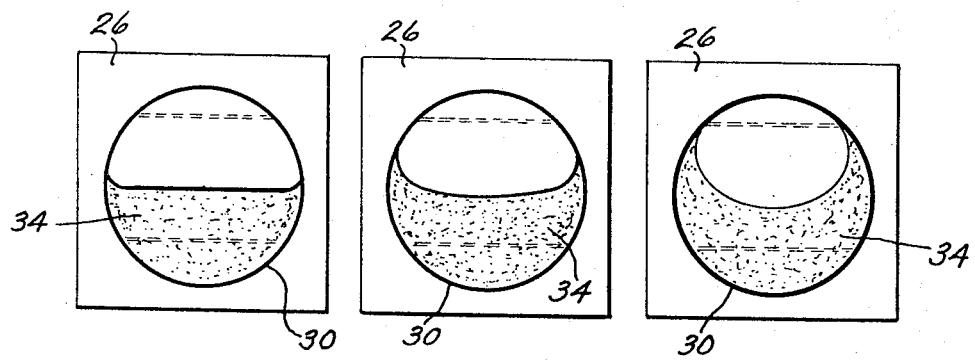
FIGURE 3 is a two dimensional view of a transverse section of a circular tank and showing the configuration of the liquid when subjected to substantial gravity.
FIGURE 4 is a view similar to FIGURE 3, but with the liquid subjected to approximately half gravity.
FIGURE 5 is a view similar to FIGURE 3, but with the test liquid being subjected to substantially "zero" gravity.

Three dimensional simulation of liquids subjected to reduced gravity is effected between the glass plates 24 and 26 and within the space 32 formed by the peripheral gasket therebetween. In operation, a suitable test liquid 34 is inserted into the liquid receiving space 32 by means of an associated hypodermic needle (not shown) inserted through the resilient boundary gasket 30. In the preferred form, the space 32 is half filled with test liquid 34. To obtain various effective gravity fields, the simulator S is angled to the horizontal in the manner shown in FIGURE 2 and the configuration of the test liquid is observed through the glass plates 24 and 26. Typical liquid configurations are shown in FIGURES 3, 4 and 5 wherein the gasket 30 is formed in a circle to represent the cross-section of a cylindrical fuel tank. In FIGURE 3, for example, the simulator S is disposed at an angle to the horizontal of $0.84 \times 10^{-1}$ radians which represents a substantial gravity field. In FIGURE 4, the angle is $1.1 \times 10^{-2}$ radians representing a medium gravity field, and in FIGURE 5 the angle is $8.9 \times 10^{-4}$ radians representing substantially reduced gravity. In practice, part of the test liquid 34 often vaporizes to form a liquid-vapor combination.

Figure 7:
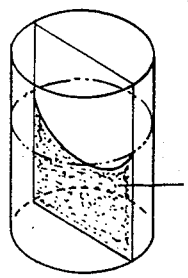
FIGURE 7 is a perspective schematic view of a fuel tank containing the two dimensional model boundary of FIGURE 6.
Figure 8:
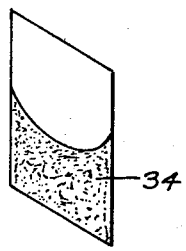
FIGURE 8 is a perspective view of the two dimensional model boundary of FIGURE 7.
Figure 6:
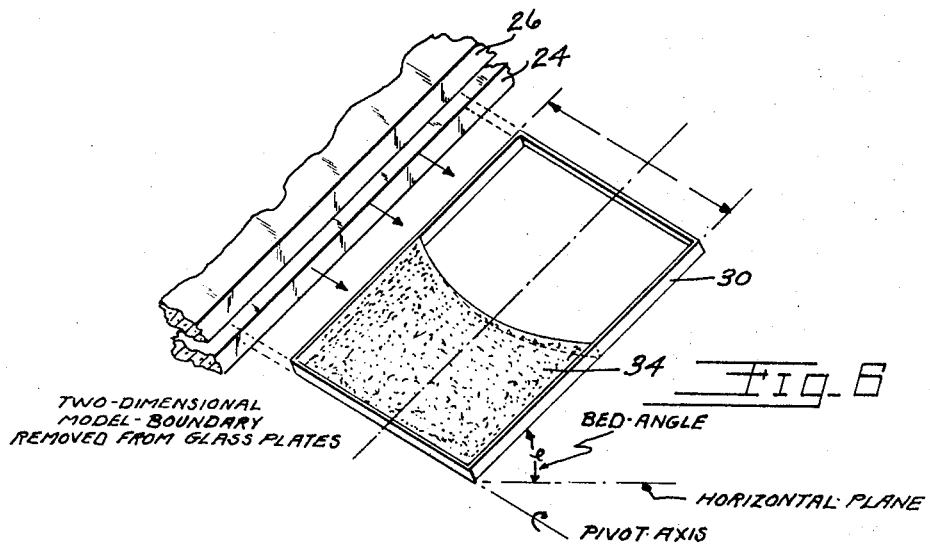
FIGURE 6 is a perspective schematic view of a rectangular two dimensional model boundary removed from the glass plates of the simulator.

If the boundary gasket 30 is formed in a rectangular configuration, a central longitudinal section of a cylindrical fuel tank is effected as shown in FIGURES 6, 7 and 8.

Thus, the invention basically includes a pair of parallel planar, substantially transparent lower and upper plates 24 and 26 slightly spaced from each other, with an endless peripheral boundary gasket or member 30 of predetermined shape or two-dimensional configuration therebetween to form, with the plates, a liquid receiving space 32 partially filled with a test liquid 34 such as, for example, ethyl alcohol (200 proof ethanol). Suitable means are provided for tilting the plates 24 and 26 in unison (about an inner lower edge of the plates) to preselected angles to the horizontal whereby the configuration of the liquid 34 may be observed as such plates are tilted to simulate a two-dimensional liquid container transverse section configuration under reduced gravity.

To facilitate retaining the simulator at a given preselected angle to the horizontal, a spacer 70 of predetermined thickness may be disposed beneath an outer lower edge of the plates (i.e. the leg 72) of the bed plate 22. Thus, various spacers 70 of preselected thickness will dispose the simulator at corresponding preselected angles. The hinge 23 and the spacer 70 include one type of means for selectively tilting the spaced plates 24 and 26 to the horizontal.

In the preferred form, the plates 24 and 26 are formed of glass, although any suitable substantially transparent material will be effective. At least one of such plates should be transparent.

The plates 24 and 26 are preferably spacd apart a distance slightly less than the distance permitting the test liquid 34 therebetween to just contact both plates. Such spacing is determined by certain characteristics of the test liquid such as the specific gravity and surface tension characteristic of the liquid being tested. Also, such spacing between the plates may be maintained by the spacers 36. The test liquid also contacts the boundary gasket or member 30.

The boundary gasket 30 may be configured in accordance with the section of the tank for which a reduced-gravity liquid configuration is desired. For example, FIGURES 3, 4 and 5 represent a transverse section of a cylindrical tank. FIGURES 6, 7 and 8 represent a longitudinal section of a cylindrical tank. Also in FIGURE 6, the plates, as well as the gasket configuration, are rectangular.

When the space 32 is being partially filled with a test liquid 34 by a hypodermic needle as aforedescribed, a second hypodermic needle may be inserted through the gasket 30 to vent air from such space to the atmosphere.

Thus, the invention provides a very simple device which can approximately simulate the isothermal equilibrium liquid configuration in propellant tanks of various shapes and sizes that are subject to reduced gravity ranging from one to near "zero" gravity. Experimental results compare most favorably with drop-tower results.

The invention involves the principle of disposing two parallel flat glass plates in closely spaced relation so that the two-dimensional liquid shape in the plane of the plates is only effected by the gravity component and the tank boundaries in that plane. Thus, when the plates are horizontal, the test liquid will assume the zero-gravity shape for the particular two-dimensional tank boundaries and the liquid used between the plates. While the apparatus itself appears to be quite simple, the results obtained are quite valuable from an analytical basis. Also, this apparatus is quite inexpensive to construct and operate when compared with the large capital investment in the drop tower facility which is utilized for similar studies.

The invention also contemplates the method of simulating the configuration taken by a liquid and vapor combination 34 because of surface tension when in contact with an object 30 in a reduced gravity environment comprising the steps of, positioning said object 30 between a pair of horizontally disposed planar surfaces 24 and 26 arranged parallel to one another, injecting a predetermined quantity of said liquid 34 into contact with said object 30 and both of said surfaces 24 and 26, and tilting said surfaces 24 and 26 with said liquid 34 and object 30 therebetween to a slight angle relative to horizontal thereby varying the gravity component of said liquid 34.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. A reduced-gravity liquid configuration simulator for liquid containers comprising; a pair of parallel, planar, substantially transparent upper and lower plates slightly spaced from each other; an endless peripheral boundary gasket forming a boundary of predetermined shape disposed between the plates in liquid-sealing relation therewith to form a closed liquid-receiving space within the boundary and between the plates; a test liquid disposed in said space to partially fill the same; and means for selectively tilting the spaced plates in unison to preselected angles to the horizontal whereby the configuration of the liquid in said space may be observed as the plates are tilted to said angles, said plates being spaced from each other a distance permitting the test liquid to contact both plates, said space simulating a two-dimensional liquid container transverse sectional configuration.

2. The structure of claim 1 wherein said plates are formed of transparent glass.

3. The structure of claim 1 wherein said plates and said space are rectangular, and said plates are tilted about an inner lower edge thereof.

4. The structure of claim 2 wherein said tilting means includes a horizontally-disposed planar base, said plates being hinged along said edge to said base, and also including a spacer of predetermined thickness disposed between the outer lower edge of the plates and said base, whereby the plates may be tilted on said base to a predetermined angle and retained at such angle by placing said spacer between the base and said outer lower edge.

5. The structure of claim 1 and further including a horizontally disposed base plate, means for leveling the base plate, a rectangular bed plate hinged at one edge to said base plate, said lower plate disposed on said bed plate, said boundary gasket disposed on said lower plate, said upper plate disposed on said boundary gasket, a clamping gasket disposed on said upper plate, a clamping plate disposed on said clamping gasket, and clamping means for retaining the bed plate, lower and upper plates, and clamping plate together to form a composite unit.

6. The structure of claim 5 wherein said boundary gasket is formed of a resilient material so as to receive an associated hypodermic needle for partially filling said space with said test liquid.

7. The structure of claim 6 wherein a second hypodermic needle is inserted through the boundary gasket to function as a vent.

8. The structure of claim 5 and further including vacuum means for retaining the bed plate and the lower plate together in tight air-sealing relation.

9. The structure of claim 8 wherein said vacuum means includes at least one passageway formed in said bed plate and connected at its outer end to a vacuum hose which is connected to an associated source of vacuum producing means, the inner end of the passageway leading to a plurality of open vacuum channels formed in the upper surface of the bed plate.

10. The structure of claim 5 and further including at least one bed leg secured to the bed plate at its edge opposite said one edge, and a separable spacer of preselected thickness disposed below said bed leg for retaining the unit at one of said preselected angles.

11. The structure of claim 5 wherein said leveling means includes a plurality of leveling screws operatively disposed in said base plate for leveling the same on an associated horizontal surface.

12. The structure of claim 5 and further including spacers of preselected width disposed between said upper and lower plates to space the same from each other a distance permitting the test liquid to contact both of such plates.

13. The structure of claim 5 wherein said clamping means includes a first pair of spaced parallel clamping boards disposed on said clamping plate, a second pair of spaced parallel clamping boards disposed on said first pair of clamping boards, a third pair of spaced parallel clamping boards disposed on the underside of said bed plate, and a plurality of adjustable clamping bolts connecting said second and third pair of clamping boards to retain the bed plate, lower and upper plates and clamping plate together to form said composite unit.

14. The structure of claim 13 and further including a gasket disposed between said upper plate and said clamping plate to provide uniform clamping between such plates.

15. A reduced gravity liquid configuration simulator comprising:

a pair of plates spaced from one another in parallel relationship, at least one of said plates being substantially transparent;

a member forming a two dimensional configuration between said plates, a test liquid disposed between said plates in contact with said member, the distance between said plates being such that the test liquid contacts the surfaces of both plates; and means for selectively tilting said spaced plates in unison to preselected angles to the horizontal whereby the configuration of the liquid in contact with said member may be observed as the plates are tilted to said angles.

16. A method of simulating the configuration taken by a liquid and vapor combination because of surface tension when in contact with an object in a reduced gravity environment comprising the steps of, positioning said object between a pair of horizontally disposed planar surfaces arranged parallel to one another, injecting a predetermined quantity of said liquid into contact with said object and both of said surfaces, and tilting said surfaces with said liquid and object therebetween to a slight angle relative to horizontal thereby varying the gravity component of said liquid.

References Cited

UNITED STATES PATENTS

| 681,400 | 8/1901 | McCarty | 35—20 |
| 874,110 | 12/1907 | Packard. | |
| 1,379,642 | 5/1921 | Meeks | 40—137 X |
| 2,814,895 | 12/1957 | Flam | 40—126 |
| 3,270,441 | 9/1966 | Hewes et al. | 35—29 |

OTHER REFERENCES

L. E. Knott Apparatus Co., Boston, Catalogue 21, Rec'd Sci. Lib. January 1917, page 74 only.

EUGENE R. CAPOZIO, *Primary Examiner.*

H. S. SKOGQUIST, *Assistant Examiner.*

U.S. Cl. X.R.

35—10